United States Patent Office 3,161,552

Patented Dec. 15, 1964

3,161,552
COMPOSITION AND PROCESS FOR POWDERLESS ETCHING

James W. Bradley, Atlanta, Ga., and Paul F. Borth, Park Forest, Ill., assignors to Photo-Engravers Research Inc., Savannah, Ga., a corporation of Georgia No Drawing. Filed June 22, 1961, Ser. No. 127,779
20 Claims. (Cl. 156—14)

This invention relates to the etching of photoengraving copper. More particularly, it relates to powderless etching, and provides a novel procedure for powderless etching and a novel composition for use in the procedure, whereby improvement in powderless etching is realized.

Photoengraving copper printing plates, which can be copper or brass, are made by depositing a photosensitive film on the plate, impressing on the film the image to be printed by exposing the film to light passed through a negative of the image, removing the unexposed film (which overlies the image area), and providing the remainder of the film (which serves to define the image area) in a hardened and acid resistant condition by chemically treating or by baking this portion of the film. The plate is then contacted with an etching solution, and the solution attacks the copper of the image area, but not the copper covered by the acid resistant coating, whereby the image is provided in relief on the plate.

From a consideration of the foregoing, it will be readily apparent that in order to accurately produce the image on the plate, it is necessary to control the extent to which the etching solution etches the sidewalls which form about the periphery of the image area as the etching progresses. With respect to etching of the sidewalls, this can be considered as involving two actions on the sidewalls. One of these is the reduction of printing area due to sidewall etching and is referred to or measured as "etch factor" and the other is "undercutting action" which is the tendency for removal of metal beneath edge portions of the acid resistant coating. Etch factor is the ratio of depth of etch remote from the sidewall to sidewall etch at the printing surface (i.e. the surface contacting the acid resistant coating). As to undercutting, speaking in reference to the etching of type characters, in the case of actual undercutting, the base of the characters would be narrower than the printing surface for the characters.

A high etch factor is essential to suitable etching since if the etch factor is low, the image is not accurately reproduced. As to undercutting, actual undercutting is undesirable; a right angle sidewall is suitable but in general is not a practical condition to maintain, rather, in general some inward slope is tolerable, but the inward slope should not be excessive so as to significantly reduce the image area in relief.

In the past, a suitable etch factor has been provided and undercutting has been controlled by periodically interrupting the etching procedure and burning an acid resistant coating onto the sidewalls. Thus, at intervals during etching, the plates were removed from the etching bath, dried, treated to deposit powder on the sidewalls, and then fired to convert the powder to an acid resistant film. This manner of preventing undercutting has the obvious disadvantage of requiring frequent interruption of the etching procedure. To obviate this disadvantage, it has been proposed to utilize a procedure wherein an acid resistant film is formed on the sidewalls as etching progresses. Thus, the sidewall protective film is provided, so to speak, automatically as etching proceeds, and the periodic interruption of the etching is unnecessary. This new procedure is termed "powderless etching." It has been used successfully for the production of photoengraving copper printing plates.

The basic powderless etching process is described in Jones Patent 2,746,848. As is described in the Jones patent, thiourea is included in the etching bath and as etching proceeds a protective covering forms on the sidewalls of the image area. The same covering which forms on the sidewalls, of course, tends to form on other exposed copper surface and, therefore, tends to form throughout the image area. To accommodate this condition, the etching procedure is modified so that any film formed on the image area is promptly removed. This is done by employing a splashing technique to contact the etching solution and the plate. The solution in splash form travels a course substantially perpendicular to the image area, and upon striking the image area, abrades away any film which has formed. The splash, of course, also strikes the sidewalls, but the angle of incidence with the sidewalls is such that the protective film on the sidewalls is not removed. Further, the etching solution also strikes the acid resistant coating which defines the image area. This, however, is without significance since the acid resistant coating is not affected by impingement of the etching solution. An alternative to the splashing process, is to carry out the etching while the plates are immersed in the etching solution, and removing the film from the image area, but not from the sidewalls, by suitably brushing the image area.

Instead of using thiourea as the sidewall protective film precursor, the dimer of thiourea, formamidine disulfide, can be used. The use of formamidine disulfide is described in co-pending application Serial No. 732,419, filed May 2, 1958 (Patent No. 3,033,725, issued May 8, 1962).

Still other precursors are ethylene thiourea and substituted ethylene thiourea. The use of these materials is described in co-pending application Serial No. 115,619, filed June 8, 1961.

Various mixtures of the aforementioned precursors can be used.

In the practice of powderless etching, as described above, variables in addition to etch factor and undercutting or sidewall etch, are depth of etch, as for instance halftone etching and deep etching; nature of the image such as lines, open areas, type characters; characteristics of the protective film precursor such as the adhesion between the resulting film and copper; and the abrading force accompanying the contacting of the etching solution and the image area as where abrading is by a high or low velocity impingement of the etching solution on the image area. As a practical matter, the abrading force is commonly fixed since a given apparatus is used, and the depth of etch and nature of the image are dependent on the task to be accomplished and are thus conditions imposed on the operation. The etch factor and sidewall slope or undercutting, as described above, are quantitative expressions for the fidelity of the etching and hence are dependent variables. This leaves the character of the protective film as a variable which can be worked with conveniently to accommodate the apparatus to the conditions imposed by the task to be accomplished.

The principal object of the invention is to provide for control of the character of the protective film, whereby to facilitate the powderless etching procedure.

According to the invention, there is included in the protective film precursor composition or in the etching solution in which the protective film precursor is incorporated, a modifying agent the ultimate effect of which is to vary the slope of the sidewall for otherwise fixed operating conditions.

The modifying agent affects the character of the film in respect to adherence, hardness or brittleness, and hence the extent to which it is removed by the abrading force. Thus, given a precursor which adheres strongly to the sidewalls and hence promotes formation of sidewalls having a gradual slope, if modifying agent is added, the film will be more susceptible to removal by the abrading force and hence the sidewall slope will be greater. Also, if type characters, for example, are being formed, the film may adhere so strongly that little etching occurs in small areas such as open areas of a's, e's, etc. The use of the modifying agent will in such cases modify the film so that suitable removal by the abrading force occurs, and hence the etching becomes satisfactory. Thus, the modifying agents can be used to accommodate a film precursor to the powderless etching and to particular tasks such as deep etching, halftone etching, fine line etching, etc.

The modifying agents of the invention are organic ring compounds. They can be represented by the formula:

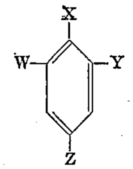

wherein W, X, Y, and Z are each selected from the group consisting of nitro, amino, lower alkyl substituted amino, acid radical of a lower fatty acid, hydroxy and hydrogen with the proviso that at least two of W, X, Y, and Z are other than hydrogen and are in ortho or para relation.

As to suitable lower alkyl radicals in embodiments including substituted amino, the requirement that the modifying agent be soluble in the etching bath, limits the alkyl radicals to the lower members, such as the $C_1$ radical. The same consideration limits the acid radicals of lower fatty acids which can be included in the modifying agent, to the lower members, such as the acetic acid, acid radical, i.e. $CH_3COO$—.

As specific examples of the modifying agents, there can be mentioned:

Pyrogallol
2,4-diaminophenol dihydrochloride
Tannic acid
Hydroquinone
p-Benzoquinone
Catechol
o-Benzoquinone
Picric acid
2,4-dinitrophenol
4-amino, 2-nitrophenol
p-Phenylenediamine
o-Phenylenediamine
o-Aminophenol Compounds which will form, in the etching solution, any compounds of the foregoing formulae can, of course, be used.

Tannic acid, mentioned in the foregoing list is of the following formula:

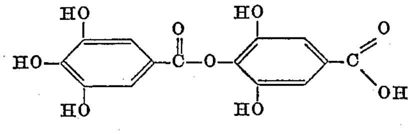

The modifying agent is effective where the protective film precursor is a thiourea compound, for example the thiourea compounds mentioned above as precursors. Of note is the effectiveness of the modifying agent where the precursor is or contains ethylene thiourea.

Ethylene thiourea is distinctive in that it provides a film which adheres strongly to the copper. In fact, the adherence is so strong as to render it unsuitable, when used alone for some etching tasks. As disclosed in application Serial No. 115,619, filed June 8, 1961, of Lewis W. Elston, this condition can be dealt with by admixing with the ethylene thiourea, formamidine disulfide or thiourea. According to the instant invention, the condition can be dealt with by using the modifying agent. In general, the modifying agent is well suited for use with ethylene thiourea precursors, or precursors containing ethylene thiourea, for example, with precursors comprising principally ethylene thiourea, or precursors comprising ethylene thiourea in large proportion, or precursors comprising a substantial proportion of ethylene thiourea. It is not, however, essential that the precursor contain ethylene thiourea, as it can consist essentially of other thiourea compounds which function as precursors, e.g. formamidine disulfide or thiourea.

Preferred modifying agents are pyrogallol, 2,4-diaminophenol, and tannic acid. 2,4-diaminophenol dihydrochloride is available commercially under the name Amidol, see p. 334, Merck Index, 7th ed. The diaminophenol can be used as hydrochloride or other acid salt such as the dihydrochloride.

The modifying agent can be in the form of a mixture of the compounds mentioned as modifying agents.

With respect to the hydroxyphenols, hydroquinone and catechol, it is believed that use of these is equivalent to use, respectively, of p-benzoquinone and o-benzoquinone. Under the acidic and oxidizing conditions an equilibrium between the hydroxyphenol and the quinone is to be expected.

The compositions of the invention are admixtures comprising a thiourea compound which is a protective film precursor, and a film modifier according to the invention. The admixture can be in the form of a powder. An anti-caking agent can be included. The composition can be incorporated into an etching bath as is known for protective film precursors.

The proportion of modifying agent to thiourea compound, in weight percent, can be from 1–25%, preferably 2–15%. Smaller amounts than 1% can be used, as any amount will provide some modifying action, but in general, at least 1% is necessary for suitable modification. Larger amounts than 25% can be used, but ordinarily this will not be desirable due to effectiveness or wastefulness.

The amount of modifying agent used depends of course on the particular precursor composition with which it is used and also the etching task to be carried out. It also depends on the particular modifying agent used. In general, the optimum amount is about 10% by weight of precursor. There are, however, exceptions. Thus, for 2,4-dinitrophenol, the optimum amount is about 20%, whereas for p-phenylenediamine the optimum amount is about 2%.

As anti-caking agent, pyrogenic silica can be used. This is a fine flocculated silica, which is available under the trade mark Cab-O-Sil and is manufactured by Godfrey L. Cabot Company, Boston, Mass. About 10 grams of the pyrogenic silica per pound of precursor material is effective.

Representative compositions and ones which have been found suitable for the etching of type characters are the following formulations, wherein composition is given in parts by weight,

FORMULATION 1

| | Parts by weight |
|---|---|
| Ethylene thiourea | 50–55 |
| Formamidine disulfide dihydrochloride | 45–50 |
| 2,4-diaminophenol dihydrochloride | 10 |

FORMULATION 2

| | |
|---|---|
| Ethylene thiourea | 60–65 |
| Formamidine disulfide dihydrochloride | 35–40 |
| Pyrogallol | 10 |

FORMULATION 3

| | |
|---|---|
| Ethylene thiourea | 45–60 |
| Formamidine disulfide | 40–55 |
| 2,4-dinitrophenol | 10 |

In this formulation, the formamidine disulfide can be varied to suit the particular conditions of the etching.

It can be varied over the full range of possible proportions. In general, however, the proportion of ethylene thiourea to formamidine disulfide should be 0.15–4.0 (0.15 part ethylene thiourea to 4.0 parts ethylene thiourea per part of formamidine disulfide dihydrochloride) or 0.15–3.0, and preferably 1.0–1.75. Thiourea can replace all or part of the formamidine disulfide or some thiourea can be included in the composition, for example, thiourea in amount of about 5–20% of the formamidine disulfide dihydrochloride can be included.

The etching baths are composed as are those used heretofore for powderless etching, and in addition, contain the modifying agent. If desired, the modifying agent and thiourea compound can be added to the bath separately. The amount of modifying agent in the bath can be from about 0.15–0.7, preferably about 0.15–0.5, gram per liter. Less than 0.15 gram per liter can be used, as any amount will provide some degree of the desired effect. Also, more than 0.7 gram per liter can be used. In fact, the only upper limit to the amount of modifying agent is the amount which will dissolve in the bath.

The bath is a ferric chloride aqueous solution of 26 to 46° Bé., preferably 30° Bé. The amount of thiourea compound in the bath can be 0.5 to about 10, preferably 0.5–5 grams per liter. Less than 0.5 gram per liter can be used, and here also the only upper limit is the solubility of the thiourea compound in the bath.

In etching of copper, in general, and speaking in thousandths of an inch, for etching depths greater than about 3–5, some form of sidewall protection is necessary. In powderless etching, thiourea or formamidine disulfide can provide good protection for depths of 15 to 20, but for greater depths, the protection is not satisfactory. Ethylene thiourea is highly adhesive with respect to copper, so that it is not generally suitable if used alone. A combination of ethylene thiourea and formamidine disulfide or thiourea is suitable for etching to depths in excess of 15 to 20. Yet, this combination does not provide suitable etching of type characters having small enclosed areas. If in the combination, the modifying agent is used, then such type characters can be etched satisfactorily.

In terms of sidewall slope, measuring slope as an angle, in particular the acute angle between the sidewall and a line or plane perpendicular to the plate, the slope should be in the range of 0–40° and is preferably 0–30°, and as a practical matter a good slope to strive for is 20–30°. The modifying agent of the invention can be included in thiourea compound precursor compositions in order to provide the desired slope.

The invention is further described in the following example.

*Example*

A series of runs are carried out in a 30° Bé. ferric chloride etching solution, to which there is added 2–3 grams per liter of a powdered mixture of ethylene thiourea, formamidine disulfide, and pyrogenic silica, and in some runs 2,4-diaminophenol dihydrochloride as modifying agent.

The ethylene thiourea and formamidine disulfide proportion is varied for different runs, between 2–1 part by weight ethylene thiourea per part by weight of formamidine disulfide dihydrochloride. Pyrogenic silica (anticaking agent) is used in amounts of 10 grams per pound and the modifying agent is used in amount of 10% of the weight of the thiourea compounds. The bath is stirred to effect dissolution and to distribute the added materials uniformly therein. It is then employed for etching copper plates, having a resistant coating partially covering the plate, so as to define the image. The etching is performed in a splash machine having an 8″ diameter paddle wheel and operated at 600 r.p.m. Etching temperature is 80° F.±1°, etching time is 10 minutes.

In thousandths of an inch, the depth of etch in a 0.020 inch circle for runs in which the modifying agent is not used, is 7, 9, and 6, whereas for runs in which modifying agent is used, the depth of etch in the 0.020 inch circles is 11, 11, 9 and 12. In open areas, for all runs, the depth of etch is 15–16.

A 0.020 inch circle approximates conditions applying for etching of type characters.

Applications and patents mentioned herein are assigned to the assignee of the instant application.

Unless otherwise indicated, "parts," proportions and percentages are on a weight basis.

While the invention has been described with reference to particular embodiments thereof, modifications and variations will occur to those skilled in the art, and it is desired to secure by these Letters Patent all such alterations.

What is claimed is:

1. In a process of etching photoengraving copper to make therein an image in relief which comprises providing a copper plate having the image area exposed for etching, and contacting the image area with an etching solution including a protective film precursor which tends in the etching environment to provide a protective film over the copper, the protective film being abraded in a manner to allow the film to continue to protect the image area from undercutting, the improvement which comprises, including in the etching solution a film modifier in effective amounts of at least one percent by weight, based on protective film precursor, so as to effect modification of the protective film thereby improving its removal characteristics and affording more effective etching, said film modifier being of the formula:

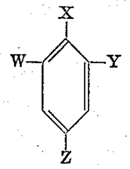

wherein W, X, Y, and Z are each selected from the group consisting of nitro, amino, lower alkyl substituted amino, acid radical of a lower fatty acid, hydroxy, and hydrogen with the proviso that at least two of W, X, Y, and Z are other than hydrogen and are in ortho or para relation.

2. In a process of etching photoengraving copper to make therein an image in relief which comprises providing a copper plate having the image area exposed for etching, and contacting the image area with a 26 to 46° Bé. ferric chloride etching solution including a thiourea compound as a protective film precursor which tends in the etching environment to provide a protective film over the copper, the protective film being abraded in a manner to allow the film to continue to protect the image area from undercutting, the improvement which comprises, including in the etching solution a film modifier in effective amounts of at least one percent by weight, based on protective thiourea compound, so as to effect modification of the protective film thereby improving its removal characteristics and affording more effective etching, said film modifier being of the formula:

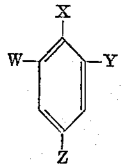

wherein W, X, Y, and Z are each selected from the group consisting of nitro, amino, lower alkyl substituted amino, acid radical of a lower fatty acid, hydroxy, and hydrogen with the proviso that at least two of W, X, Y, and Z are other than hydrogen and are in ortho or para relation.

3. In a process of etching photoengraving copper to make therein an image in relief which comprises providing a copper plate having the image area exposed for etching, and contacting the image area with a 26 to 46° Bé. ferric chloride etching solution including ethylene thiourea as a protective film precursor which tends in the etching environment to provide a protective film over the copper, the protective film being abraded in a manner to allow the film to continue to protect the image area from undercutting, the improvement which comprises, including in the etching solution a film modifier in effective amounts of at least one percent by weight, based on protective film precursor, so as to effect modification of the protective film thereby improving its removal characteristics and affording more effective etching, said film modifier being of the formula:

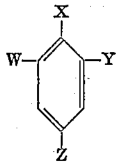

wherein W, X, Y, and Z are each selected from the group consisting of nitro, amino, lower alkyl substituted amino, acid radical of a lower fatty acid, hydroxy, and hydrogen with the proviso that at least two of W, X, Y, and Z are other than hydrogen and are in ortho or para relation.

4. The process of claim 3, wherein said film modifier is employed in amounts ranging from 1 to 25 wt. percent of the ethylene thiourea compound.

5. A process according to claim 3, said etching solution including as protective film precursor in addition to said ethylene thiourea, formamidine disulfide.

6. A process according to claim 3, said film modifier comprising pyrogallol.

7. A process according to claim 3, said film modifier comprising 2,4-diaminophenol dihydrochloride.

8. A process according to claim 3, said film modifier comprising tannic acid.

9. A process according to claim 3, said film modifier comprising hydroquinone.

10. A process according to claim 3, said film modifier comprising p-benzoquinone.

11. A process according to claim 3, said film modifier comprising catechol.

12. A process according to claim 3, said film modifier comprising o-benzoquinone.

13. A process according to claim 3, said film modifier comprising picric acid.

14. A process according to claim 3, said film modifier comprising 2,4-dinitrophenol.

15. A process according to claim 3, said film modifier comprising 4-amino, 2-nitrophenol.

16. A process according to claim 3, said film modifier comprising p-phenylenediamine.

17. A process according to claim 3, said film modifier comprising o-phenylenediamine.

18. A process acording to claim 3, said film modifier comprising o-aminophenol.

19. A composition for use in the powderless etching of photoengraving copper to provide a protective film about the periphery of the image area during the etching wherein the film has been modified so as to permit its abrasion from small areas of the image area so as to permit proper etching thereof, consisting essentially of, in admixture, a 26° to 46° Bé. ferric chloride etching solution, a thiourea compound as protective film precursor in amounts sufficient to provide a protective film along the side walls of the image area, and at least 1 wt. percent based on thiourea compound and in amounts effective to modify the protective film produced by said thiourea compound of a film modifier having the following formula:

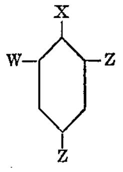

wherein W, X, Y, and Z are each selected from the group consisting of nitro, amino, lower alkyl substituted amino, acid radical of a lower fatty acid, hydroxy, and hydrogen with the proviso that at least two of W, X, Y, and Z are other than hydrogen and are in ortho or para relation.

20. The composition of claim 19, wherein said thiourea compound is an ethylene thiourea compound.

References Cited by the Examiner

UNITED STATES PATENTS

| | | | |
|---|---|---|---|
| 2,694,001 | 11/54 | Hayes et al. | 252—79.4 |
| 2,698,781 | 1/55 | Meyer | 156—19 |
| 2,746,848 | 5/56 | Jones | 156—8 |
| 3,033,793 | 5/62 | Bradley et al. | 156—14 XR |

EARL M. BERGERT, *Primary Examiner.*

ALEXANDER WYMAN, *Examiner.*